(12) United States Patent
Shao et al.

(10) Patent No.: US 9,798,653 B1
(45) Date of Patent: Oct. 24, 2017

(54) METHODS, APPARATUS AND DATA STRUCTURE FOR CROSS-LANGUAGE SPEECH ADAPTATION

(75) Inventors: Xu Shao, Norwich (GB); Andrew Breen, Bracon Ash (GB)

(73) Assignee: Nuance Communications, Inc., Burlington, MA (US)

( * ) Notice: Subject to any disclaimer, the term of this patent is extended or adjusted under 35 U.S.C. 154(b) by 224 days.

(21) Appl. No.: 12/773,998

(22) Filed: May 5, 2010

(51) Int. Cl.
*G06F 17/20* (2006.01)
*G06F 12/00* (2006.01)

(52) U.S. Cl.
CPC .............. *G06F 12/00* (2013.01); *G06F 17/20* (2013.01)

(58) Field of Classification Search
CPC .... G06F 17/271; G06F 17/274; G06F 17/275; G06F 17/277; G06F 17/289; G06F 17/2715; G06F 17/2735; G06F 17/2755; G06F 17/2785; G06F 17/2795; G06F 17/2818; G06F 17/2827; G06F 17/2836; G06F 17/2863; G06F 17/2872; G06F 9/4448
USPC .......................... 704/1–9, 258, 260, 270, 272
See application file for complete search history.

(56) References Cited

U.S. PATENT DOCUMENTS

| | | | | |
|---|---|---|---|---|
| 4,975,956 A | * | 12/1990 | Liu et al. ...................... | 704/219 |
| 5,546,500 A | * | 8/1996 | Lyberg ........................... | 704/277 |
| 5,682,501 A | * | 10/1997 | Sharman ................. | G10L 13/08 704/256 |
| 5,689,616 A | * | 11/1997 | Li ......................... | G10L 15/005 704/232 |
| 5,708,759 A | * | 1/1998 | Kemeny ................. | G10L 15/02 704/211 |
| 5,802,182 A | * | 9/1998 | Pritchard ........................ | 381/61 |
| 5,832,435 A | * | 11/1998 | Silverman ..................... | 704/260 |
| 5,865,626 A | * | 2/1999 | Beattie et al. ................ | 434/185 |
| 5,918,236 A | * | 6/1999 | Wical ............................ | 715/209 |
| 5,970,454 A | * | 10/1999 | Breen ........................... | 704/269 |
| 5,978,764 A | * | 11/1999 | Lowry et al. ................. | 704/258 |
| 5,987,412 A | * | 11/1999 | Breen ........................... | 704/260 |
| 6,073,096 A | * | 6/2000 | Gao et al. ..................... | 704/245 |

(Continued)

OTHER PUBLICATIONS

Quaza S., Donetti L., Moisa L, Salza P.L., "ACTOR: a Multilingual Unit-Selection Speech Synthesis System," 4th ITRW on Speech Synthesis, Perthshire Scottland, 2001.*

Traber, C. et al., "From multilingual to polyglot speech synthesis," Proceedings of Eurospeech '99, Budapest, 1999.*

(Continued)

*Primary Examiner* — Fariba Sirjani
(74) *Attorney, Agent, or Firm* — Chapin IP Law, LLC

(57) ABSTRACT

Adapted speech models produce fluent synthesized speech in a voice that sounds as if the speaker were fluent in a language in which the speaker is actually non-fluent. A full speech model is obtained based on fluent speech in the language spoken by a first person who is fluent in the language. A limited set of utterances is obtained in the language spoken by a second person who is non-fluent in the language but able to speak the limited set of utterances in the language. The full speech model of the first person is then processed with the limited set of utterances of the second person to produce an adapted speech model. The adapted speech model may be stored to a multi-lingual speech model as a child node of a root with an associated language selection question and branches pointed to the adapted speech model and other speech models, respectively.

7 Claims, 6 Drawing Sheets

(56) References Cited

U.S. PATENT DOCUMENTS

| | | | |
|---|---|---|---|
| 6,085,160 A * | 7/2000 | D'hoore | G09B 19/06 704/2 |
| 6,112,175 A * | 8/2000 | Chengalvarayan | 704/256.5 |
| 6,141,642 A * | 10/2000 | Oh | G10L 13/08 704/260 |
| 6,205,426 B1 * | 3/2001 | Nguyen et al. | 704/255 |
| 6,212,500 B1 * | 4/2001 | Kohler | G10L 15/005 704/1 |
| 6,272,462 B1 * | 8/2001 | Nguyen et al. | 704/244 |
| 6,292,776 B1 * | 9/2001 | Chengalvarayan | 704/219 |
| 6,324,510 B1 * | 11/2001 | Waibel | G10L 15/02 704/232 |
| 6,324,512 B1 * | 11/2001 | Junqua et al. | 704/275 |
| 6,327,565 B1 * | 12/2001 | Kuhn et al. | 704/255 |
| 6,330,538 B1 * | 12/2001 | Breen | 704/260 |
| 6,341,264 B1 * | 1/2002 | Kuhn et al. | 704/255 |
| 6,366,882 B1 * | 4/2002 | Bijl et al. | 704/235 |
| 6,366,883 B1 * | 4/2002 | Campbell | G10L 13/07 704/258 |
| 6,453,294 B1 * | 9/2002 | Dutta et al. | 704/270.1 |
| 6,460,017 B1 * | 10/2002 | Bub | G10L 15/005 704/256 |
| 6,502,074 B1 * | 12/2002 | Breen | 704/260 |
| 6,691,083 B1 * | 2/2004 | Breen | 704/220 |
| 6,732,074 B1 * | 5/2004 | Kuroda | 704/244 |
| 6,778,962 B1 * | 8/2004 | Kasai et al. | 704/266 |
| 6,813,607 B1 * | 11/2004 | Faruquie | G10L 21/06 704/258 |
| 6,868,381 B1 * | 3/2005 | Peters et al. | 704/249 |
| 6,915,259 B2 * | 7/2005 | Rigazio et al. | 704/244 |
| 6,915,260 B2 * | 7/2005 | Botterweck | 704/250 |
| 6,917,918 B2 * | 7/2005 | Rockenbeck et al. | 704/244 |
| 6,993,462 B1 * | 1/2006 | Pavlovi | G06K 9/00342 382/103 |
| 6,999,925 B2 * | 2/2006 | Fischer | G10L 15/07 704/236 |
| 7,043,431 B2 * | 5/2006 | Riis et al. | 704/259 |
| 7,089,183 B2 * | 8/2006 | Gong | G10L 15/07 704/244 |
| 7,302,393 B2 * | 11/2007 | Fischer et al. | 704/254 |
| 7,315,818 B2 * | 1/2008 | Stevens et al. | 704/235 |
| 7,454,336 B2 * | 11/2008 | Attias | G06K 9/6226 704/240 |
| 7,472,061 B1 * | 12/2008 | Alewine et al. | 704/243 |
| 7,496,498 B2 * | 2/2009 | Chu et al. | 704/4 |
| 7,551,784 B2 * | 6/2009 | Narasimhan et al. | 382/228 |
| 7,567,896 B2 * | 7/2009 | Coorman et al. | 704/10 |
| 7,584,097 B2 * | 9/2009 | Yao | 704/233 |
| 7,603,276 B2 * | 10/2009 | Yoshizawa | G10L 15/06 704/243 |
| 7,653,530 B2 * | 1/2010 | Carter et al. | 704/9 |
| 7,668,718 B2 * | 2/2010 | Kahn et al. | 704/270 |
| 7,689,417 B2 * | 3/2010 | Huang et al. | 704/246 |
| 7,861,149 B2 * | 12/2010 | Wang et al. | 715/201 |
| 7,912,718 B1 * | 3/2011 | Conkie et al. | 704/258 |
| 7,912,721 B2 * | 3/2011 | Dow et al. | 704/270 |
| 8,032,827 B2 * | 10/2011 | Melander et al. | 715/234 |
| 8,041,567 B2 * | 10/2011 | Astrov | G10L 15/065 704/256.1 |
| 8,099,281 B2 * | 1/2012 | Gleason | 704/260 |
| 8,121,841 B2 * | 2/2012 | Badino et al. | 704/260 |
| 8,244,534 B2 * | 8/2012 | Qian | G10L 13/06 704/243 |
| 8,275,621 B2 * | 9/2012 | Alewine | G10L 13/08 704/231 |
| 8,321,224 B2 * | 11/2012 | Badino | G10L 13/08 704/258 |
| 8,352,272 B2 * | 1/2013 | Rogers | G10L 13/00 704/266 |
| 8,712,776 B2 * | 4/2014 | Bellegarda | G10L 13/08 704/258 |
| 8,831,948 B2 * | 9/2014 | Roberts | G10L 13/043 704/257 |
| 8,990,087 B1 * | 3/2015 | Lattyak | G10L 13/08 704/201 |
| 2001/0032080 A1 * | 10/2001 | Fukada | 704/258 |
| 2003/0018531 A1 * | 1/2003 | Mahaffy et al. | 705/16 |
| 2003/0028376 A1 * | 2/2003 | Meron | G10L 13/06 704/258 |
| 2003/0061041 A1 * | 3/2003 | Junkins | G10L 19/0018 704/254 |
| 2004/0088163 A1 * | 5/2004 | Schalkwyk | 704/251 |
| 2004/0128132 A1 * | 7/2004 | Griniasty | 704/254 |
| 2004/0158457 A1 * | 8/2004 | Veprek et al. | 704/201 |
| 2004/0193398 A1 * | 9/2004 | Chu et al. | 704/3 |
| 2005/0137870 A1 * | 6/2005 | Mizutani | G10L 13/06 704/264 |
| 2005/0144003 A1 * | 6/2005 | Iso-Sipila | 704/269 |
| 2005/0182630 A1 * | 8/2005 | Miro et al. | 704/269 |
| 2005/0197838 A1 * | 9/2005 | Lin et al. | 704/260 |
| 2005/0203738 A1 * | 9/2005 | Hwang | G10L 15/063 704/243 |
| 2006/0041429 A1 * | 2/2006 | Amato | G10L 13/08 704/260 |
| 2006/0136216 A1 * | 6/2006 | Shen | G10L 13/08 704/266 |
| 2006/0149558 A1 * | 7/2006 | Kahn | G10L 15/063 704/278 |
| 2006/0173684 A1 * | 8/2006 | Fischer et al. | 704/254 |
| 2006/0206333 A1 * | 9/2006 | Paek | G10L 15/07 704/260 |
| 2006/0229875 A1 * | 10/2006 | Acero | G10L 15/07 704/261 |
| 2007/0033003 A1 * | 2/2007 | Morris | G10L 15/04 704/9 |
| 2007/0033027 A1 * | 2/2007 | Yao | 704/233 |
| 2007/0033028 A1 * | 2/2007 | Yao | 704/233 |
| 2007/0033034 A1 * | 2/2007 | Yao | 704/244 |
| 2007/0055523 A1 * | 3/2007 | Yang | 704/257 |
| 2007/0106491 A1 * | 5/2007 | Carter et al. | 704/4 |
| 2007/0118377 A1 * | 5/2007 | Badino | G10L 13/08 704/260 |
| 2008/0040115 A1 * | 2/2008 | Asakawa et al. | 704/260 |
| 2008/0077511 A1 * | 3/2008 | Zimmerman | 705/28 |
| 2008/0082333 A1 * | 4/2008 | Nurminen | G10L 21/00 704/250 |
| 2008/0147404 A1 * | 6/2008 | Liu et al. | 704/256.2 |
| 2008/0195391 A1 * | 8/2008 | Marple | G10L 13/10 704/260 |
| 2008/0235024 A1 * | 9/2008 | Goldberg et al. | 704/260 |
| 2009/0006097 A1 * | 1/2009 | Etezadi | G10L 13/08 704/260 |
| 2009/0018836 A1 * | 1/2009 | Morita | G10L 13/07 704/260 |
| 2009/0048841 A1 * | 2/2009 | Pollet et al. | 704/260 |
| 2009/0048843 A1 * | 2/2009 | Nitisaroj et al. | 704/260 |
| 2009/0055162 A1 * | 2/2009 | Qian | G10L 13/06 704/8 |
| 2009/0070116 A1 * | 3/2009 | Mizutani | 704/260 |
| 2009/0112596 A1 * | 4/2009 | Syrdal et al. | 704/260 |
| 2009/0157409 A1 * | 6/2009 | Lifu et al. | 704/260 |
| 2009/0271195 A1 * | 10/2009 | Kitade et al. | 704/239 |
| 2009/0326945 A1 * | 12/2009 | Tian | 704/254 |
| 2010/0057435 A1 * | 3/2010 | Kent et al. | 704/3 |
| 2010/0114806 A1 * | 5/2010 | Harrison et al. | 706/14 |
| 2010/0138222 A1 * | 6/2010 | Herbig | G10L 15/065 704/243 |
| 2010/0145678 A1 * | 6/2010 | Csomai et al. | 704/9 |
| 2010/0169090 A1 * | 7/2010 | Cui et al. | 704/233 |
| 2010/0169093 A1 * | 7/2010 | Washio | G10L 15/063 704/243 |
| 2010/0179811 A1 * | 7/2010 | Gupta et al. | 704/235 |
| 2010/0198577 A1 * | 8/2010 | Chen | G06F 17/289 704/2 |
| 2010/0198600 A1 * | 8/2010 | Masuda | 704/278 |
| 2010/0250257 A1 * | 9/2010 | Hirose et al. | 704/278 |
| 2011/0218804 A1 * | 9/2011 | Chun | G06F 17/289 704/243 |
| 2011/0224979 A1 * | 9/2011 | Raux | 704/233 |
| 2011/0307241 A1 * | 12/2011 | Waibel et al. | 704/2 |

(56) References Cited

U.S. PATENT DOCUMENTS

| | | | |
|---|---|---|---|
| 2011/0313764 A1* | 12/2011 | Bacchiani et al. | 704/235 |
| 2012/0109630 A1* | 5/2012 | Badino | G10L 13/08 |
| | | | 704/2 |
| 2012/0173241 A1* | 7/2012 | Li et al. | 704/260 |
| 2012/0278081 A1* | 11/2012 | Chun | G10L 13/02 |
| | | | 704/260 |
| 2013/0030789 A1* | 1/2013 | Dalce | 704/2 |
| 2013/0132069 A1* | 5/2013 | Wouters et al. | 704/8 |

OTHER PUBLICATIONS

L. Badino, C. Barolo, S. Quazza, "A General Approach to TTS Reading of Mixed-.Language Tests", in ICSLP-2004.*

A comparative study of speaker adaptation techniques L Neumeyer, A Sankar, V Digalakis—system, 1995—speech.sri.com.*

A comparison of supervised and unsupervised cross-lingual speaker adaptation approaches for HMM-based speech synthesis H Liang, J Dines, L Saheer—Acoustics Speech and Signal . . . , 2010—ieeexplore.ieee.org.*

A comparative study of spectral mapping for speaker adaptation S Nakamura, K Shikano—Acoustics, Speech, and Signal . . . , 1990—ieeexplore.ieee.org.*

Nick Campbell, "Foreign Language Speech Synthesis," Third ESCA/COCOSDA Workshop on Speech Synthesis, Jenolan Caves House, Blue Mountains, NSW, Australia, Nov. 26-29, 1998.*

B Leonardo, B Claudia, Q Silvia, "A general approach to TTS reading of mixed-language texts," Proc. of 5th ISCA Speech Synthesis Workshop, 2004.*

* cited by examiner

200 OBTAIN A FULL SPEECH MODEL BASED ON FLUENT SPEECH IN A LANGUAGE SPOKEN BY A FIRST PERSON WHO IS FLUENT IN THE LANGUAGE

201 OBTAIN A LIMITED SET OF UTTERANCES SPOKEN BY A SECOND PERSON WHO IS NON-FLUENT IN THE LANGUAGE

202 OBTAIN THE LIMITED SET OF UTTERANCES IN A NATIVE LANGUAGE, DIFFERENT THAN THE LANGUAGE, SPOKEN AS FLUENT SPEECH BY THE SECOND PERSON

203 OBTAIN THE LIMITED SET OF UTTERANCES IN THE LANGUAGE SPOKEN BY THE SECOND PERSON WHO IS ABLE TO SPEAK THE LIMITED SET OF UTTERANCES IN THE LANGUAGE

204 PROCESS THE FULL SPEECH MODEL OF THE FIRST PERSON WITH THE LIMITED SET OF UTTERANCES OF THE SECOND PERSON TO PRODUCE AN ADAPTED SPEECH MODEL THAT CAN BE USED TO PRODUCE FLUENT SYNTHESIZED SPEECH IN THE LANGUAGE IN A VOICE THAT SOUNDS AS IF THE SECOND PERSON WERE FLUENT IN THE LANGUAGE

205 ADAPT THE FULL SPEECH MODEL WITH VOICE FEATURES OF THE LIMITED SET OF UTERANCES TO PRODUCE THE ADAPTED SPEECH MODEL

206 PRODUCE A VOICE FEATURE MAP THAT DESCRIBES, FOR EACH VOICE FEATURE OF THE SECOND PERSON IN THE LIMITED SET OF UTTERANCES TO BE APPLIED TO THE FULL SPEECH MODEL OF THE FIRST PERSON, AN ADAPTATION OF THE VOICE FEATURE OF THE SECOND PERSON IN THE LIMITED SET OF UTTERANCES TO A CORRESPONDING VOICE FEATURE OF THE FIRST PERSON IN THE FULL SPEECH MODEL TO PRODUCE THE ADAPTED SPEECH MODEL

207 STORE VOICE FEATURE ENTRIES IN THE FEATURE MAP FOR AT LEAST ONE OF SPECTRUM, PITCH, MAXIMUM VOICE FREQUENCY AND DELTA-DELTA COEFFICIENTS

FIG. 2

204 PROCESS THE FULL SPEECH MODEL OF THE FIRST PERSON WITH THE LIMITED SET OF UTTERANCES OF THE SECOND PERSON TO PRODUCE AN ADAPTED SPEECH MODEL THAT CAN BE USED TO PRODUCE FLUENT SYNTHESIZED SPEECH IN THE LANGUAGE IN A VOICE THAT SOUNDS AS IF THE SECOND PERSON WERE FLUENT IN THE LANGUAGE

208 APPLY A TRANSFORMATION TO THE FULL SPEECH MODEL WITH THE LIMITED SET OF UTTERANCES

209 APPLY AT LEAST ONE OF A CONSTRAINED MAXIMUM LIKELIHOOD LINEAR REGRESSION (CMLLR) TRANSFORMATION, MLLR ADAPTATION OF THE MEAN (MLLRMEAN) TRANSFORMATION, VARIANCE MLLR (MLLRVAR) TRANSFORMATION AND MAXIMUM A POSTERIORI (MAP) LINEAR REGRESSION TRANSFORMATION ETC.

210 APPLY A PLURALITY OF THE TRANSFORMATIONS TO THE FULL SPEECH MODEL ACCORDING TO THE LIMITED SET OF UTTERANCES TO PRODUCE A PLURALITY OF ADAPTED SPEECH MODELS

211 SYNTHESIZE SPEECH IN THE LANGUAGE USING EACH OF THE PLURALITY OF ADAPTED SPEECH MODELS TO GENERATE A PLURALITY OF SYNTHESIZED SPEECH SAMPLES

212 PRESENT THE PLURALITY OF SPEECH SAMPLE FOR SELECTION OF ONE OF THE PLURALITY OF TRANSFORMATIONS THAT PRODUCED A SYNTHESIZED SPEECH SAMPLE HAVING A VOICE THAT MOST CLOSELY RESEMBLES THE VOICE OF THE SECOND PERSON AND SOUNDS AS IF THE SECOND PERSON WERE FLUENT IN THE LANGUAGE

FIG. 5

METHODS, APPARATUS AND DATA STRUCTURE FOR CROSS-LANGUAGE SPEECH ADAPTATION

BACKGROUND

Speech synthesis is the artificial production of human speech by a machine such as a computer system programmed with software that can produce speech based on data processing. A computer system used for this purpose is called a speech synthesizer, and such systems can be implemented in software or hardware. A conventional text-to-speech (TTS) system converts normal written language text into speech that can be played through a speaker system for audible listening by a person. Other systems render symbolic linguistic representations like phonetic transcriptions into speech. Some conventional TTS systems can create synthesized speech by concatenating pieces of recorded speech that are stored in a database. Alternatively, a conventional TTS synthesizer can incorporate a model of the vocal tract and other human voice characteristics to create a completely "synthetic" voice output. For example, in a method known as Statistical Parametric Synthesis, speech synthesis may be based on Hidden Markov Models (HMMs) in which the frequency spectrum (vocal tract), fundamental frequency (vocal source), and duration (prosody) of speech are modeled simultaneously. Hidden Markov Models also model the degree of voicing, which describes how sound is produced within the vocal tract. Typically, this includes a mix of voice sounds (i.e., those produced by the vibration of the vocal folds) and unvoiced sounds (i.e., those produced by turbulent air passing through a constriction in the vocal tract). A TTS system using parameters from HMMs generates speech waveforms using a speech synthesizer, such as a vocoder, from HMMs, themselves, based on various transforms. The speech waveforms can then be reproduced as sound via loudspeakers for human listening.

SUMMARY

The quality of a conventional speech synthesizer is judged by its ability to produce speech waveforms that have close similarity to a human voice, and by its ability to be understood by a person listening to the synthesized speech. However, conventional text-to-speech (TTS) systems tend to be mono-lingual; that is having very poor ability to synthesize sounds from multiple languages. Concatenative systems struggle because of the amount of speech data needed to make a system multi-lingual. Conventional Hidden Markov Model (HMM)-based systems also tend to be mono-lingual; that is, having models and phoneme sets which are heavily tuned to one language. However, a difficulty in building a multi-lingual system is finding a speaker who is capable of speaking the multiple languages.

Conventional TTS systems, in general, do not adequately synthesize speech in multiple languages from the same TTS voice using input speech that comprises multiple languages. For example, a conventional TTS system (e.g., a satellite navigation system) may be required to synthesize speech in multiple languages (e.g., when used in Quebec, Ontario, Canada where both English and French street names are used). In such contexts, the text to be converted or synthesized into speech may have sentences that include some words in a first language, such as English, and other words in a second language, such as French. When a conventional TTS system attempts to synthesize speech for words of the second language, the synthesized voice changes dramatically because the conventional TTS system is trained using a model for only the first language. In such cases, it sounds as if two different voices are being used to synthesize the speech as opposed to a single voice that is multi-lingual. Accordingly, conventional TTS systems are not well adapted to be able to produce TTS synthesis for multi-lingual text.

The above example illustrates two problems of conventional TTS and related speech synthesis systems. First, a conventional TTS system using a TTS voice in only a first language fails to adequately synthesize speech from text in a second language (e.g., directions and units of measurement in the satellite navigation system would be synthesized in English appropriately; however, French street names would not sound as if they were spoken by a fluent French speaker). Likewise, a conventional TTS system using a TTS voice in only the second language would fail to adequately synthesize speech from text in the first language (e.g., directions and units of measurement in the satellite navigation system would not sound as if they were spoken by a fluent English speaker; however, French street names would be synthesized in French appropriately). Stated differently, while some conventional systems are able to produce speech for both languages, from the perspective of the listener, the speech produced from text in the first language sounds as if it is spoken (i.e., synthesized) by a different person than the speech synthesized for words in the second language.

It may be possible that the conventional TTS system may be able to dynamically switch to a TTS voice in the second language to synthesize text in the second language (e.g., dynamically switch to a French TTS voice to synthesize the French street names). However, this causes the second problem noted above. That is, unless the TTS voices in both the first and second languages were trained by the same speaker who is fluent in both languages, the speech synthesized in the first and second TTS voices by the conventional TTS system will sound as if it is being spoken by two different people (i.e., a first speaker that trained the English-based TTS voice and a second speaker that trained the French-based TTS voice).

Example embodiments of the present invention substantially overcome these and other problems of conventional TTS systems by providing methods and apparatus and a computer readable medium that include a cross-language speech adapter for generating adapted speech models that can be used to produce fluent synthesized speech in a voice that sounds as if the speaker were fluent in a language in which the speaker is actually non-fluent. In other words, the systems disclosed herein are able to synthesize multi-lingual text and make it sound as if the same person were speaking the text in the multiple languages, even though a speaker model from which the TTS systems were trained is based on a speaker who is fluent in only one of the languages. Stated generally, the system disclosed herein is able to perform cross-language adaptation to make the TTS system sound as if a single person is fluent in many languages when, in reality, the voice model of the person is actually only fluent in a single language.

In operation, the system is able to perform TTS synthesis for many languages mixed together in the same body of text and make the synthesized speech sound as if the same person spoke fluently in all languages. Generally, to do so, a fluent model of speech from a first person in each language (derived from someone who can fluently speak that language) is adapted by a transition matrix made by a second person who only can speak a limited set of utterances in that other language (or languages).

Even if the second person cannot properly speak any utterance in other language, example embodiments of the present invention disclosed herein are still able to perform the adaptation by using a limited set of utterances in the second person's fluent (i.e., native) language to adapt the first person's speech model because all languages have some similar phonemes. For example, both Mandarin and English include the phonemes /b/ and /t/. However, those similar phonemes may be very different in their respective languages because the context of the different languages may be different (e.g., /b/ or /t/ may have some tonal co-articulation effect in Mandarin but not in English). While it is possible to use the second persons fluent (i.e., native) language to adapt the first persons fluent model of speech to the second persons fluent language, the results are not as favorable as to using a limited set of utterances from made by the second person in the other language.

Using this adapted model, the TTS system disclosed herein can synthesize multi-lingual text in a voice of the second person for multiple languages. Specifically, the languages would include the native or fluent language of this second person (e.g., English), as well as the models of other people fluent in other languages that have been adapted by a limited non-fluent model based on utterances of this second person in the language in which they are not fluent.

For the following description, the TTS system as disclosed herein will be able to perform TTS synthesis in the voice of the second person (not the first) for many different languages. To do so, the TTS system can use a fluent model from the second person for the main language of that second person to speak fluently in the second person's native language. For other languages in which the second person is not fluent, the system obtains a fluent model from a first person who is fluent in that language, and then adapts this model based on a limited set of utterances spoken by the second person in that language (but note that the second person is not actually fluent in the first person's language). It is important to note then that, in the following discussion, the first person fluent model is a model that is adapted by a limited set of utterances spoken by a second person and that the TTS system, using this adapted model, is able to speak the language spoken by the first person but make it sound as if the second person is speaking.

In operation, the system obtains a full speech model based on fluent speech in the language spoken by a first person who is fluent in the language. As an example, the first person may be fluent in French and the system obtains (or is provided access to) a fully trained TTS French speech model of that first person in the French language in which the speaker is fluent. Next, a limited set of utterances spoken by a second person is obtained. In some embodiments, the second person is non-fluent in the language and is able to speak the limited set of utterances in the language; in other embodiments, the limited set of utterances is obtained in the language fluently (i.e., natively) spoken by the second person. In one example embodiment, the limited set of utterances in the language may be 30 or fewer utterances. The full speech model of the first person is then transformed with the limited set of utterances spoken by the second person to produce an adapted speech model that can be used to produce fluent synthesized speech in the language in a voice that sounds as if the second person were fluent in the language. This allows the TTS system to speak the fluent language of the second person (e.g., English) using his or her fluent or native speech model, and then, if multi-lingual text is encountered, the system can use the adapted model that is a derivative model that is based on a fluent speech model of a first person (e.g., a model in French based on the first person's voice who is fluent in French) that is adapted by a limited set of utterances spoken by the second person.

In this manner, the TTS system can use a set of one or more adapted models for different languages and can produce speech that sounds like it is spoken by the same speaker. To enable the system to work with many languages, only a limited set of utterances spoken by the second person is obtained. Then a fluent speech model in the language is adapted as disclosed herein using a transition matrix to produce a model that can produce speech in that given language as if it were the voice of the person who provided the limited set of utterances. The adaptation process uses features of the limited set of utterances to calculate the transition matrix and then to adapt a fluent model in a given language. By performing this for a number of languages, the system can provide TTS synthesis for many languages as if the same person were speaking them all, even though the system was not trained by a single person having fluency in each of those languages. The system can maintain a tree that can use a language selection feature in its root node to select, in real-time, during TTS processing, which model in which language should be used for TTS synthesis.

In certain embodiments, the adapted speech model is produced by adapting (i.e., converting) the full speech model with voice features of the partial speech model to produce the adapted speech model. The adapting may be performed by producing a voice feature map that describes, for each voice feature of the second person to be applied to the full speech model of the first person, an adaptation of the voice feature of the full speech model of the first person to a corresponding voice feature of the second person to produce the adapted speech model. Voice features may include pitch, maximum voice frequency, spectrum and delta-delta coefficients.

In other embodiments, the adapted speech model is produced by applying a transformation to the full speech model with the limited set of utterances. Such transformations may include a constrained maximum likelihood linear regression (CMLLR) transformation, MLLR adaptation of the mean (MLLRMEAN) transformation, variance MLLR (MLLR-VAR) transformation and maximum a posteriori (MAP) linear regression transformation or other adaptation techniques. To choose which transformation produces a voice that most closely resembles the voice of the second person and sounds as if the second person were fluent in the language, a plurality of the transformations calculated from the limited set of utterances may be applied to the full speech model to produce a plurality of adapted speech models. Each of those plurality of adapted speech models may be synthesized in the language using each of the plurality of adapted speech models to generate a plurality of synthesized speech samples which may be presented for optimization.

In further embodiments, a language differentiator feature may be assigned to the adapted speech model. A speech model may be obtained, and a new root node of a multi-lingual speech model may be generated, according to the language differentiator feature. The adapted speech model may be stored according to the language differentiator feature to a new child node, with branches pointing to the speech model and the new child node storing the adapted speech model.

Example embodiments also include a data structure (i.e., a multi-lingual speech model), such as a final binary probability density function (PDF) tree, for language selection in a computerized device for speech synthesis. A root node of the multi-lingual speech model enables selection of a one of a plurality of child nodes each storing a speech model according to a respective language differentiator feature assigned to the speech model. The root node includes an associated language selection question enabling selection of a proper branch according to the answer to the language selection question. For example, a language selection node, such as in a binary PDF, includes non-leaf nodes each storing a question. For example, a root node question may be "Is the language English?" with branches for "yes" and "no." When traversing the tree for a proper child node or model for synthesis, it is known which language is going to be used. Therefore, if the desired language is English, traversal follows the "yes" branch.

During speech synthesis in a computerized device of an obtained text composed in a first language and a second language, an example method includes obtaining a speech model based on the first language trained from utterances spoken by a first person and an adapted speech model based on the second language. As discussed above, the adapted speech model is produced by obtaining a full speech model based on fluent speech in the first language spoken by a first person who is fluent in the language, obtaining a limited set of utterances in the second language spoken by a second person who is non-fluent in the language, and processing the full speech model of the first person with the limited set of utterances spoken by the second person to produce the adapted speech model. In certain embodiments, the second person is able to speak the limited set of utterances in the language. The speech model based on the first language and the adapted speech model based on the second language are then applied to respective portions of the text to produce fluent synthesized speech in both the first language and the second language in a voice that sounds as if the second person were fluent in both the first language and the second language. The speech model may be a full (i.e., native) speech model or an adapted speech model.

Selection of a language may be enabled by the root node of the multi-lingual speech model. Each branch from the root node may point to a child node allowing traversal to a speech model in one language or multiple languages according to the answer to the language selection question associated within the language selection node. In certain embodiments, a language selection question of the root node may enable selection of the speech model for a proper language. A branch pointing to a child node storing an adapted speech model matching a language differentiator of the second language in the text may be identified and selected so the speech model stored at the identified node may be used to synthesize speech.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. Embodiments may be in hardware, software or a combination of hardware and software. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a flow diagram illustrating the steps performed by a cross-language speech adapter for speech synthesis according to an example embodiment of the present invention.

FIG. 5 is a flow diagram illustrating the steps performed by the adaptation module for processing the full speech model of the first person with a limited set of utterances spoken by the second person to produce an adapted speech model that can be used to produce fluent synthesized speech in the first language in a voice that sounds as if the second person were fluent in the first language according to an example embodiment of the present invention.

DETAILED DESCRIPTION

Figure 1:
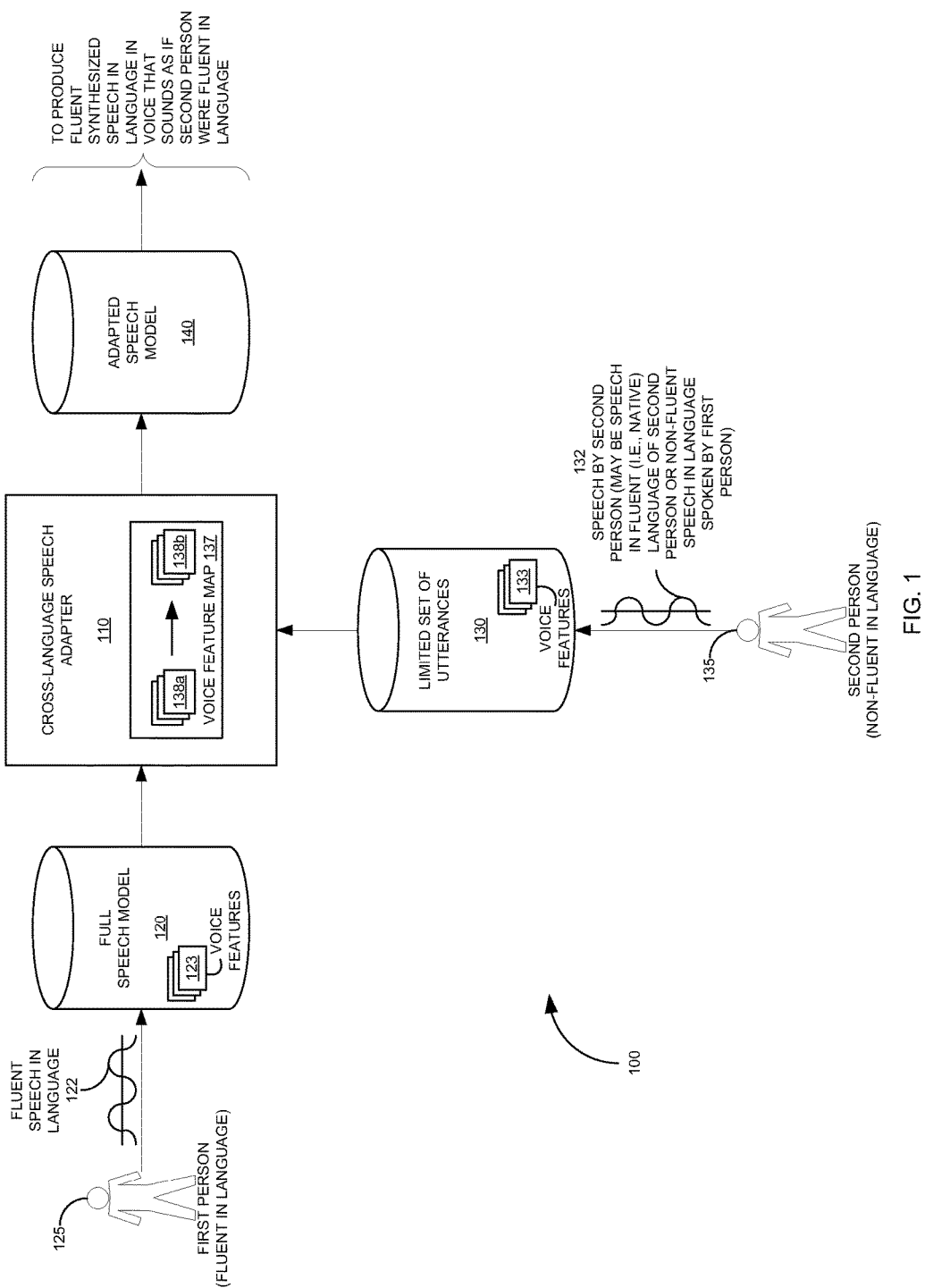
FIG. 1 is a diagram illustrating a system for cross-language speech adaptation according to an example embodiment of the present invention.

FIG. 1 is a diagram illustrating a system 100 for cross-language speech adaptation according to an example embodiment of the present invention. The system 100 includes a cross-language speech adapter 110 that processes a full speech model 120 and a limited set of utterances 130 to produce an adapted speech model 140 that can be used to produce fluent synthesized speech in the language in a voice that sounds as if the second person were fluent in the language. The full speech model 120 includes (or is based on) fluent speech in a language 122 spoken by a first person 125 who is fluent in the language. The limited set of utterances 130 includes (or is based on) speech by a second person 135 that is not fluent in the language 132. In certain embodiments, the speech 132 is fluent speech in the fluent (i.e., native) language of the second person 135, different than the language spoken by the first person 125. In a preferred embodiment, the second person 135 is able to speak the limited set of utterances in the language spoken by the first person 125 as non-fluent speech 132 in the language.

The adapted speech model 140 may be used by a text-to-speech (TTS) engine (not shown) to produce fluent synthesized speech in the language in a voice that sounds as if the second person 135 were fluent in the language. Operation of the system 100 for cross-language speech adaptation will be discussed in greater detail with reference to the flow diagram of FIG. 2.

FIG. 2 is a flow diagram illustrating the steps performed by the cross-language speech adapter 110 for speech synthesis according to an example embodiment of the present invention. In step 200, the cross-language speech adapter 110 obtains a full speech model 120 based on fluent speech in a language 122 spoken by a first person 125 who is fluent in the language. In step 201, the cross-language speech adapter 110 obtains a limited set of utterances 130 based on speech 132 spoken by a second person 135. In certain embodiments, in step 202, the cross-language speech adapter 110 obtains fluent speech in the fluent (i.e., native) language of the second person 135, different than the language spoken by the first person 125. It should be noted that, in a preferred embodiment, the phoneme set for all languages in the cross-language adaptation should be synchronized prior to the training. In a preferred embodiment, in step 203, the cross-language speech adapter 110 obtains the limited set of utterances 130 as non-fluent speech 132 in the language spoken by the second person 135 who is able to speak the limited set of utterances in the language spoken by the first person 125.

In step 204, the cross-language speech adapter 110 processes the full speech model 120 of the first person 125 with the limited set of utterances 130 of the second person 135 to produce the adapted speech model 140 that can be used (e.g., by a TTS engine) to produce fluent synthesized speech in the language 122 in a voice that sounds as if the second person 135 were fluent in the language 122.

In certain embodiments, the limited set of utterances 130 obtained in step 201 includes 30 or fewer utterances spoken by the second person 135. An example limited set of phonetic-balanced utterances, as understood in the art for training a speech model, is provided below.

It's very possible that's the spa Oscar likes.
Wealth creation and quality of life go hand in hand.
The survey is required by federal law.
Several hundred yesterday registered to buy one via the Internet.
Prices vary in different locations, because of local economic conditions.
They have no chance to learn.
He hid the shirt under the bed.
This brings the monthly total to seven hundred twenty two.
The coins all had bees carved on them.
This is what they had known was coming.
We hope you enjoy it.
Many fishermen face bankruptcy as a result.
But their impact can't be measured in pure numbers alone.
The location will be online in London.
The fine print of the NBA policy suggests why.
The central idea in the act is balance, not assertion.
Teachers have been appalled by the language, he said.
After all we, as taxpayers, are the client.
Michael was in the middle of the partnership.
She is already working on a new novel, about poker.
Coalition forces reported no casualties overnight.
The chefs all gather their equipment and take a bow.
The officials now acknowledge that those tactics were wrong.
Roger Penrose, at Nuance dot COM.
He also allowed alternative Americans.
Welcome both old friends and newcomers.
Nobody could be that weird.
I was ready to go on reading.
Everyone wants a dog just like her.
And the issue is more complex than it seems.

In an example embodiment, to process the full speech model 120 of the first person 125 with the limited set of utterances 130 of the second person 135, the cross-language speech adapter 110, in step 205, adapts the full speech model 120 with voice features 133 of the limited set of utterances 130 to produce the adapted speech model 140. In certain example embodiments, in step 206, to adapt the full speech model 120 with voice features 133 of the limited set of utterances 130, the cross-language speech adapter 110 produces a voice feature map 137 that describes, for each voice feature 133 of the second person 135 in the limited set of utterances 130 to be applied to the full speech model 120 of the first person 125, an adaptation of the voice feature 133 of the second person 135 in the limited set of utterances 130 to a corresponding voice feature 123 of the first person 125 in the full speech model 120 to produce the adapted speech model 140. In step 207, the cross-language speech adapter 110 may store voice feature entries 138*a*, 138*b* in the voice feature map 137 for at least one of spectrum, pitch, maximum voice frequency and delta-delta coefficients.

Figure 3:
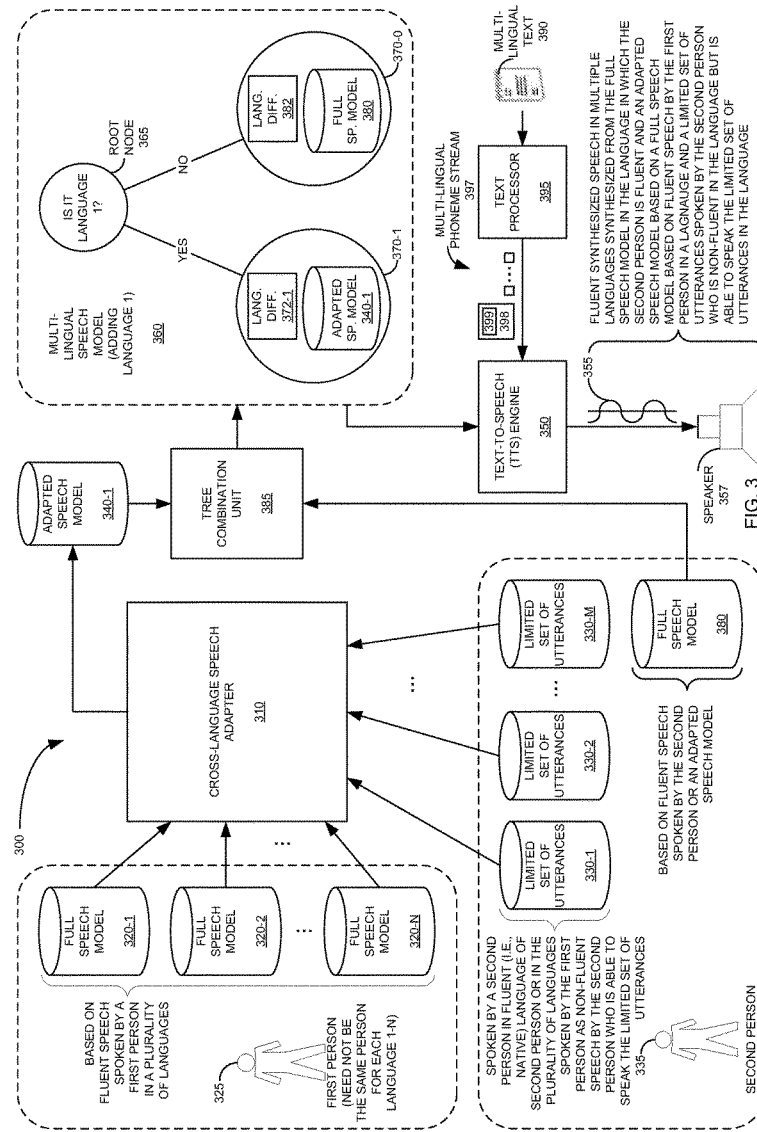
FIG. 3 is a diagram illustrating, in greater detail, a system for cross-language speech adaptation according to an example embodiment of the present invention.

FIG. 3 is a diagram illustrating, in greater detail, a system 300 for cross-language speech adaptation according to an example embodiment of the present invention. The system 300 includes a cross-language speech adapter 310 that processes a full speech model 320-1 and a limited set of utterances 330-1 to produce an adapted speech model 340-1. In this example embodiment, a plurality of full speech models 320-1-320-N are provided in different languages 1-N and are based on fluent speech in each respective language 1-N spoken by a first person who is fluent in the respective language 1-N. Similarly, a plurality of limited sets of utterances 330-1-330-M are provided in different languages 1-M, or in the fluent (i.e., native) language of the second person, based on speech spoken by a second person who is non-fluent in each respective language 1-M. Although only one adapted speech model 340-1 is shown, it should be understood that the cross-language speech adapter 310 may produce a plurality of adapted speech models 340-1-340-N by processing each of the plurality of full speech models 320-1-320-N and a respective one of the plurality of limited sets of utterances 330-1-330-N. As discussed above, the speech spoken by the second person may be fluent speech in the fluent (i.e., native) language spoken by the second person or non-fluent speech in each respective language 1-M spoken by the second person who is able to speak the limited set of utterances in each respective language 1-M.

Note that the terms "first" and "second" are used to differentiate the speakers of a particular full speech model 320-1-320-N and a speaker of the limited set of utterances 330-1-330-M. However, the speaker of each full speech model 320-1-320-N need not be the same person (i.e., any or all of the full speech models 320-1-320-N may be based on fluent speech spoken by a unique person). Likewise, the number of full speech models 320-1-320-N is not necessarily the same as the number of limited sets of utterances 330-1-330-M (i.e., there may be more or fewer limited sets of utterances 330-1-330-M than the number of full speech models 320-1-320-N).

The system 300 also includes a full speech model of the second person 380 based on speech by the second person 335 (i.e., the person who spoke the limited set of utterances 330-1-330-M). In certain embodiments, the full speech model 380 may be based on fluent speech spoken by the second person (i.e., in the native language of the second person) or an adapted speech model 340-1-340-N. Note, however, that speech synthesized based on the full speech model 320-1-320-N based on fluent speech spoken by the first person 325 will sound like the first person 325. Similarly, speech synthesized based on the full speech model of the second person 380 based on fluent speech spoken by the second person 335 will sound like the second person 335.

The full speech model 320-1-320-N may then be passed to the cross-language speech adapter 310, along with the corresponding limited set of utterances 330-1-330-M (e.g., corresponding to the language 1-N spoken in the full speech model), for processing into the adapted speech model 340-1-340-N for the language 1-N spoken in the full speech model (as will be discussed in greater detail below with regard to FIGS. 4 and 5).

The adapted speech model 340-1, for example, generated and output by the cross-language speech adapter 310, is passed along with the full speech model of the second person 380 to a tree combination unit 385. The tree combination unit 385 combines TTS engine files of the adapted speech model 340-1 and the full speech model 380 of the second person 335 by generating a new root node 365 for a multi-lingual speech model 360 according to language differentiator features 372-1. Branches are then created to each child node 370-0, 370-1. Each non-leaf node (i.e., the root node 365, although other intermediate nodes may be present) in the multi-lingual speech model 360 includes a question. For example, in the example multi-lingual speech model 360 illustrated, the root node 365 question is "Is it language 1?" (i.e., the language modeled by the first adapted speech model 340-1). The two branches (e.g., "yes" and "no") from the root node 365 allow selection of a child node 370-0, 370-1 according to their answer to the parent language selector node or respective language differentiator feature 372-1, 382.

It should be understood that the multi-lingual speech model 360 may include a root node, one or more intermediate non-leaf nodes and a plurality of child nodes, with each child node storing one speech model (e.g., full speech model or adapted speech model) according to a respective language differentiator feature assigned to the speech model. For example, in the system 300 illustrated in FIG. 3, generation of a second adapted speech model from the second full speech model 320-2 and the second limited set of utterances 330-2 would be accepted by the tree combination unit 385 along with the 360 as illustrated, would cause a creation of a new root node one level higher than the root node 365 illustrated, with branches pointing to a new child node for the second adapted speech model and the old root node 365 (i.e., now an intermediate non-leaf node).

Referring back to FIG. 3, during speech synthesis, the TTS engine 350 accepts text to convert to speech. In this example embodiment, the TTS engine 350 obtains a multi-lingual phoneme stream 397 which was transformed from multi-lingual text 390 (i.e., text composed in multiple languages) by a text processor 395. While parsing the multi-lingual text 390 into the multi-lingual phoneme stream 397, the text processor 395 analyzes the multi-lingual text 390 and assign a language differentiator feature 399 to each phoneme 398 to describe to which language it belongs.

For example, the text processor 395 may parse the multi-lingual text 390 into a phoneme string according to a configuration file that stores language tag information. The text processor 395 is able to identify a language characteristic of each word and assign a respective language tag to each phoneme converted from the word. In operation, the text processor 395 then converts the phoneme string with the language tag into the multilingual phoneme stream 397 with tri-phone context, prosodic features and language differentiator features added. For example, each line of the phoneme stream may correspond to one phoneme with particular prosodic features and language differentiator features.

The TTS engine 350 loads both the multi-lingual speech model or tree 360 and receives the multi-lingual phoneme stream 397. In hidden Markov model (HMM)-based TTS final results, all speech models are in binary tree form. Each tree includes a root node, non-leaf nodes and leaf nodes. It should be understood that there may be many layers of non-leaf nodes in the HMM. Each non-leaf node has two branches and two child nodes and has an attached question regarding the language, such as a prosodic feature. The decision of which child node is assigned to which branch depends on how the child node answers the question in parent node. The leaf nodes include real models, such as Gaussian distributions, including means, covariances and weights. During synthesis, a TTS engine 350 searches the model for the proper leaf node for a particular phoneme according to its prosodic feature or the answers to the questions attached to the non-leaf odes.

For each phoneme 398 in the multi-lingual phoneme stream 397, the TTS engine 350 searches the multi-lingual speech model 360 for the appropriate speech model 340-1, 380 according to the language differentiator features 399 of the respective phoneme 398 of the multi-lingual phoneme stream 397. For example, for each line of phoneme stream, the TTS engine 350 first finds the language differentiator feature 399 for a phoneme 398. The TTS engine 350 then follows the appropriate branch of the multi-lingual speech model or tree 360 to match other prosodic features within the branch to determine which model or leaf-node is going to be used during speech synthesis.

The language differentiator feature 399 enables the TTS engine 350 to search the multi-lingual speech model 360 for the appropriate language branch of the multi-lingual speech model 360. For example, if the language differentiator feature 399 indicates that the respective phoneme 398 to be synthesized by the TTS engine 350 is in language 1, the branch labeled "yes" is followed from the root node 365 to the child node 370-1 for the adapted speech model 340-1. Likewise, if the language differentiator feature 399 indicates that the respective phoneme 398 to be synthesized by the TTS engine 350 is not in language 1, the branch labeled "no" is followed from the root node 365 to the child node 370-0 for the full speech model 380.

The TTS engine 350 then obtains the selected speech model 340-1, 380 and applies it to respective portions of the text 390 to produce fluent synthesized speech 355. For portions of the text 390 in respective different languages, the TTS engine 350 may obtain a speech model 340-1, 380 in each of the respective languages and apply each respective speech model 340-1, 380 to each portion of the text 390 in the respective language to synthesize a voice that sounds as if the second person 335 were fluent in each of the respective languages. It should be understood that the text processor 395 may assign a plurality of language differentiator features 399 while parsing the text 390, and that selection of a speech model 340-1, 380 may repeatedly switch between the speech models available in the multi-lingual speech model 360.

Figure 4:
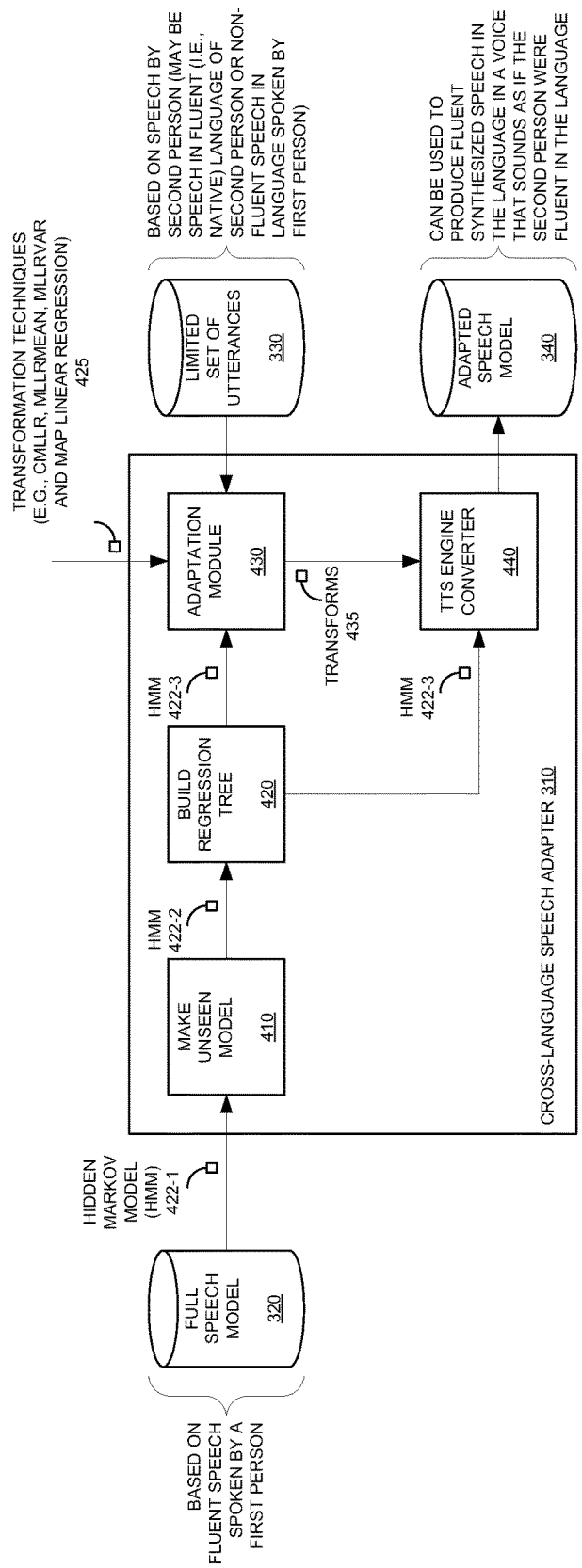
FIG. 4 is a logical flow diagram illustrating a cross-language speech adapter in greater detail.

FIG. 4 is a logical flow diagram illustrating a cross-language speech adapter (e.g., the cross-language speech adapter 310 of FIG. 3) in greater detail. The cross-language speech adapter 310 accepts an HMM (in a first form 422-1) for a full speech model (e.g., full speech model 320-1-320-N of FIG. 3, generally 320) and makes an unseen model (410) in a second form 422-2. Presuming the cross-language speech adapter 310 is performing an adaptation of a first person's full speech model based on a limited set of utterances provided by a second person, the cross-language speech adapter 310 moves limited models in the model space of the first person to the utterances by the second person. Further, it is possible that some models that are in the second person's utterances do not exist in the model space of the first person. This is referred to as an unseen model. This provides the cross-language speech adapter 310 an opportunity to determine the most similar corresponding models in the model space of the first person for those unseen models.

Following the identification of the corresponding models in the model space of the first person, the unseen model 422-2 is then used to build a regression tree (420) (i.e., a set of well-organized transition matrices from the limited set of utterances spoken by the second person). These regression trees put the HMM in a third form 422-3 and act as a bridge, when passed as an input with a limited set of utterances (e.g., limited set of utterances 330-1-330-N of FIG. 3, generally 330) and a transformation technique 425 to an adaptation module 430, to transfer models in the model space of the first person to the model space of the second person. Possible transformation techniques include a constrained maximum likelihood linear regression (CMLLR) transformation, MLLR adaptation of the mean (MLLRMEAN) transformation, variance MLLR (MLLRVAR) transformation and maximum a posteriori (MAP) linear regression transformation.

The adaptation module 430 processes the regression tree 422-3 and the limited set of utterances 330 according to the transformation technique 425 to produce transforms 435. The tree structure of the HMM in the third form 422-3 is not altered during the transformation. The transforms 435 are then passed to a TTS engine converter 440 with the HMM for the full speech model in the third form 422-3 to generate an adapted speech model (e.g., adapted speech model 340-1 of FIG. 3, generally 340), compatible with a TTS engine format, that can be used to produce fluent synthesized speech in the language in a voice that sounds as if the second person were fluent in the language.

In general, the adaptation technique moves the full speech model 320 from one language space to another according to the limited set of utterances 330. The limited set of utterances 330 has two roles: (1) to determine the base points to be transformed; and (2) to calculate a transition matrix. The adaptation module 430 then moves all models from the language space of the full speech model 330 to the language space of the limited set of utterances 340 via the transition matrix. The adaptation technique 425, the full speech model 330 and the limited set of utterances 340, as inputs to the adaptation module 430, will determine the transfer of the models from the language space of the full speech model 330 to the language space of the limited set of utterances 340. It should be understood that the more utterances or model samples, the more base points the transition matrix can have.

FIG. 5 is a flow diagram illustrating the steps performed by an adaptation module (e.g., adaptation module 430 of FIG. 4) for processing the full speech model of the first person (e.g. full speech model 320 of FIG. 4) with the limited set of utterances spoken by the second person (e.g., limited set of utterances 330 of FIG. 4) to produce an adapted speech model (e.g., adapted speech model 340 of FIG. 4) that can be used to produce fluent synthesized speech in the language in a voice that sounds as if the second person were fluent in the language according to an example embodiment of the present invention. In step 208, the adaptation module 430 applies a transformation technique (e.g., transformation technique 425 of FIG. 4) to the full speech model 320 according to the limited set of utterances 330. In certain embodiments, in step 209, the adaptation module 430 applies at least one of a constrained maximum likelihood linear regression (CMLLR) transformation, MLLR adaptation of the mean (MLLRMEAN) transformation, variance MLLR (MLLRVAR) transformation and maximum a posteriori (MAP) linear regression transformation, as discussed above.

In step 210, in certain embodiments, the adaptation module 430 may apply a plurality of the transformation techniques 425 (i.e., CMLLR, MLLRMEAN, MLLRVAR and MAP) to the full speech model 320 according to the limited set of utterances 330 to produce a plurality of adapted speech models 340. Speech may be synthesized, in step 211, using each of the plurality of adapted speech models 340 to generate a plurality of synthesized speech samples. In step 212, the plurality of speech samples may be presented for selection of a one of the plurality of transformations 425 that produced a synthesized speech sample having a voice that most closely resembles the voice of the second person 335 and sounds as if the second person 335 were fluent in the language.

Figure 6:
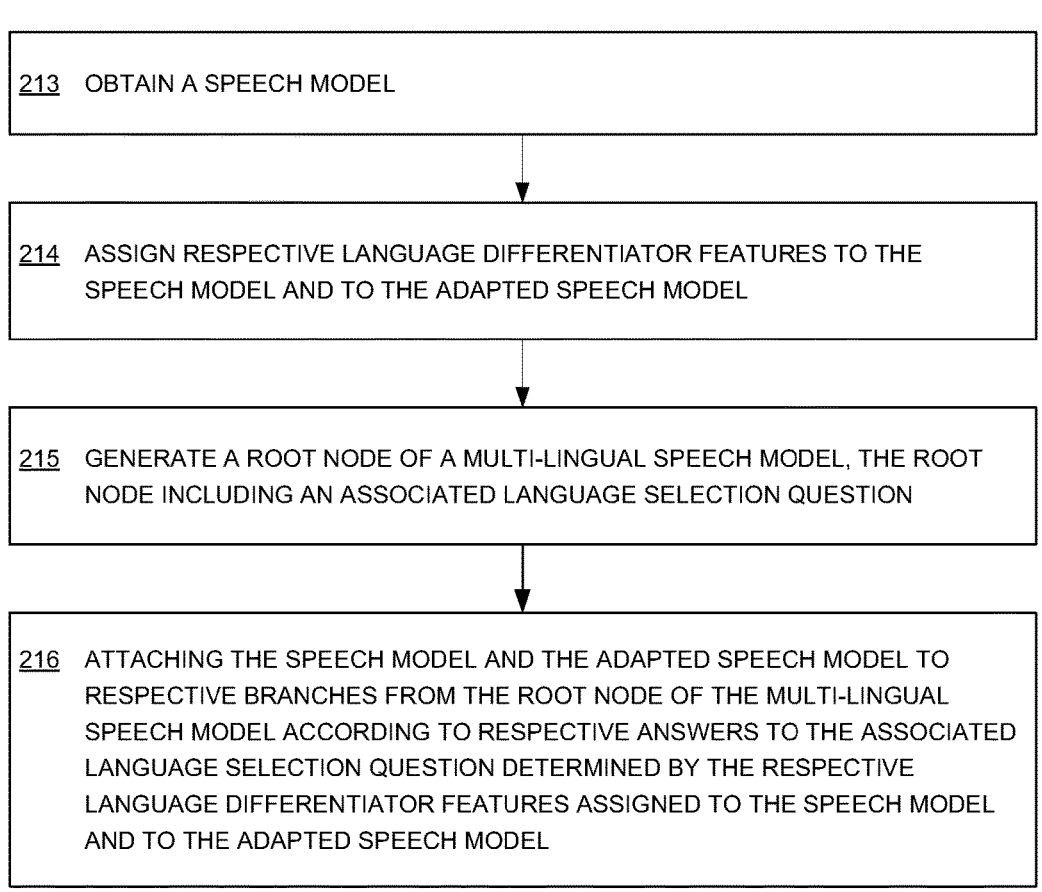
FIG. 6 is a flow diagram illustrating an example method of populating a multi-lingual speech model with a plurality of speech models.

FIG. 6 is a flow diagram illustrating an example method of generating a multi-lingual speech model (e.g., multi-lingual speech model 360 of FIG. 3). In step 213, a tree combination unit (e.g., tree combination unit 385 of FIG. 3) obtains a full speech model 380 for combination with an adapted speech mode (e.g., adapted speech model 340-1 of FIG. 3) to generate a multi-lingual speech model 360. It should be understood that the full speech model 380 may, itself, be a multi-lingual speech model, an adapted speech model, or a full speech model based on fluent speech spoken by a person.

In step 214, the tree combination unit 385 assigns respective language differentiator features (e.g., language differentiator features 372-1, 382) to the full speech model 380 and the adapted speech model 340-1. In step 215, the tree combination unit 385 generates a new root node 365 of the multi-lingual speech model 360, the root node 365 including an associated language selection question. In step 216, the tree combination unit 385 then attaches the full speech model 380 and the adapted speech model 340-1 to respective branches from the root node 365 of the multi-lingual speech model 360 according to respective answers to the associated language selection question determined by the respective language differentiator features 372-1, 382 assigned to the speech model 380 and the adapted speech model 340-1.

While this invention has been particularly shown and described with references to preferred embodiments thereof, it will be understood by those skilled in the art that various changes in form and details may be made therein without departing from the spirit and scope of the invention as defined by the appended claims.

What is claimed is:
1. A system comprising:
data storage for storing:
a full speech model based on speech in a language spoken by a first person who is fluent in the language, a limited set of utterances in a fluent language of a second person based on speech spoken by the second person who is non-fluent in the language spoken by the first person, and a full speech model of the second person based on speech by the second person, and a processor configured to implement:

a cross-language speech adapter that processes the full speech model based on speech in the language spoken by the first person and the limited set of utterances in the fluent language of the second person based on speech spoken by the second person who is non-fluent in the language spoken by the first person and outputs an adapted speech model, the processing including applying at least one transformation to the full speech model according to the limited set of utterances to produce the adapted speech model, and a tree combination unit the tree combination unit combining the full speech model of the second person based on speech by the second person and the adapted speech model with Text-to Speech (TTS) engine files of the adapted speech model and the full speech model of the second person, wherein the transformation includes a plurality of: (1) a constrained maximum likelihood linear regression (CMLLR) transformation, (2) a MLLR adaptation of the mean (MLLRMEAN) transformation, (3) a variance MLLR (MLLRVAR) transformation, and (4) a maximum a posteriori (MAP) linear regression transformation.

2. The system of claim 1 further comprising a text-to-speech (TTS) engine.

3. The system of claim 2 wherein the text-to-speech (TTS) engine outputs fluid synthesized speech.

4. The system of claim 3 wherein the text-to-speech (TTS) engine receives a multi-lingual phoneme stream.

5. The system of claim 4 wherein the multi-lingual phoneme stream was transformed from multi-lingual text by a text processor.

6. A method comprising:

receiving at an input interface of a computer system having at least a processor and a memory in addition to the input and output interface, a full speech model based on speech in a language spoken by a first person who is fluent in the language;

receiving at the input interface, a limited set of utterances in a fluent language of a second person based on speech spoken by the second person who is non-fluent in the language spoken by the first person;

applying, in the computer system, a transformation technique with an adaptation module to the full speech model according to the limited set of utterances to produce a plurality of adapted speech models, wherein a cross-language speech adapter processes the full speech model based on speech in the language spoken by the first person and the limited set of utterances in the fluent language of the second person based on speech spoken by the second person who is non-fluent in the language spoken by the first person and outputs an adapted speech model, the processing including applying at least one transformation to the full speech model according to the limited set of utterances to produce the adapted speech model; and synthesizing, in the computer system, speech using each of the plurality of adapted speech models to generate a plurality of synthesized speech samples, wherein the transformation technique includes a plurality of: (1) a constrained maximum likelihood linear regression (CMLLR) transformation, (2) a MLLR adaptation of the mean (MLLRMEAN) transformation, (3) a variance MLLR (MLLRVAR) transformation, and (4) a maximum a posteriori (MAP) linear regression transformation.

7. The method of claim 6 wherein a plurality of speech samples are presented to the adaptation module for selection of one by the plurality of transformations that produced a synthesized speech sample having a voice that most closely resembles the voice of a second person and sounds as if the second person were fluent in the language.

* * * * *